United States Patent [19]

Kee

[11] Patent Number: 4,554,591
[45] Date of Patent: Nov. 19, 1985

[54] REPRODUCIBLE IMAGE AND INFORMATION BEARING RECORD

[75] Inventor: Richard C. Kee, Chestnut Hill, Mass.

[73] Assignee: Polaroid Corporation, Cambridge, Mass.

[21] Appl. No.: 533,425

[22] Filed: Sep. 19, 1983

[51] Int. Cl.$^4$ .............................................. H04N 1/00
[52] U.S. Cl. ........................................ 358/256; 360/2; 369/13; 369/85; 369/14; 382/2
[58] Field of Search ......................... 354/107, 76, 109; 358/102, 296, 301, 302, 256, 286; 360/1, 35.1, 2, 15; 369/13, 14, 15, 85; 382/2, 62; 353/120

[56] References Cited

U.S. PATENT DOCUMENTS

| | | | |
|---|---|---|---|
| 3,022,078 | 2/1962 | Hoshino et al. | 274/41.4 |
| 3,671,044 | 6/1972 | Blazevic et al. | 274/4 J |
| 3,767,208 | 10/1973 | Chernowitz | 274/4 J |
| 4,002,829 | 1/1977 | Hutchison | 358/293 |
| 4,121,249 | 10/1978 | Lemelson | 358/132 |
| 4,179,686 | 12/1979 | Bonicalzi et al. | 382/2 |
| 4,212,037 | 7/1980 | Lemelson | 360/33 |
| 4,270,853 | 6/1981 | Hatada et al. | 354/76 |
| 4,340,286 | 7/1982 | Carr | 354/105 |

OTHER PUBLICATIONS

Kelley, J. W., "Magnetic Encoded Photo Credit Card", Nov. 1978, IBM Technical Disclosure Bulletin, vol. 21, No. 6, pp. 2515-2517.

Primary Examiner—John C. Martin
Assistant Examiner—Paul Andrew Apffel
Attorney, Agent, or Firm—Edward S. Roman

[57] ABSTRACT

A reproducible image and information bearing medium, termed herein as a photorecord, includes a visible image bearing media, such as a photographic print, negative, transparency or the like, and an attached information storage medium. The information storage medium such as a magnetic or optical stripe, is encoded with machine readable information that corresponds to the associated visual image. An original photorecord is manufactured by affixing a blank magnetic stripe to the visual image bearing medium optically reading the visual image, converting the so read optical information to an electrical signal, and recording this signal as machine readable information on the magnetic stripe. Photorecord copies of the original photorecord can be produced by reading the visually indiscernable machine readable information from the magnetic stripe from the original and (a) writing the so read information on the blank magnetic stripe of the copy and (b) controlling an optical imaging device to expose a photosensitive area of the copy and processing the exposed copy to effect the desired image reproduction. The machine readable information read from the original photorecord can be modified electronically to change various image characteristics, such as contrast, color, balance, resolution, etc., so that the image characteristics of the copies will be desirably different from those of the original. In addition to providing efficient machine reproduction of the visual image, the encoded information can be utilized to display the visual image on a cathode ray tube or other display device and/or transmitted by telecommunication techniques to remote locations for display or reproduction.

10 Claims, 7 Drawing Figures

REPRODUCIBLE IMAGE AND INFORMATION BEARING RECORD

BACKGROUND OF THE INVENTION

1. Field of the Invention

The present invention relates to imaging systems, and more particularly, to visual image systems where a visible image bearing medium, such as a photographic print, also includes a machine encoded information record for electronically reproducing the visual image on another visual image bearing medium.

2. Description of Prior Art

In the production of photographic prints from negative or positive transparency originals, it is now conventional to automate the many parameters required to provide an aesthetically pleasing or enhanced print image by accounting for such variables in the original as image density, contrast, color balance, as well as the sensitivity of the photochemistry carried by the print substrate in the context of a response to variables in the original. The characteristics of the originals are measured, analyzed and the results then used by way of a computer to control complete processing of the ultimate print. More recently, electronic systems have been developed by which substantially the complete image presented on the original is stored electronically and the stored electronic information processed to provide needed or desired image enhancement to account for variables in the original. The enhanced image facsimile is then electronically represented to produce the final photographic print.

As a result of the state of the art currently available for the production of photographic prints, a wider range of variables in the negative or positive transparency image can be tolerated without compromise in the quality of the ultimate print. The print, however, represents a unique photograph in itself so that additional copies using the same original are likely to result only if produced as multiple copies simultaneously with the originals. In other words, a print which exists in an album together with the negative or original positive transparency becomes difficult to reproduce in kind because of the many enhancement factors originally introduced in the original processing of the print from the original negative or transparency. Additionally, an inherent characteristic of a photographic print, as distinguished from a positive transparency, is that the print can be viewed only in its original format. In other words, it cannot be presented as an enlarged projected image in which the enhanced qualities are preserved. There is a need, therefore, for a method and/or system by which the aesthetic qualities of an enhanced photographic print may be faithfully reproduced either as a print copy or on an alternate image presenting medium.

SUMMARY OF THE INVENTION

In accordance with the present invention, a visual image bearing record, such as a photographic print or the like, is physically integrated with a machine encoded and readable record on which is stored the electronic information necessary to produce the visual image. The electronic information can be used to provide a faithful reproduction of the image on another visual image, bearing record or to display the image on another medium such as a cathode ray tube or similar display.

In the preferred form, the visual image bearing record takes the form of a photoprint having an associated magnetic stripe that is encoded magnetically, for example, using a video tape recorder or other data format with visually indiscernible machine readable information that corresponds to the associated visual image. The so produced 'photorecord' can be utilized to produce one or more photorecord copies by machine reading the magnetically encoded information and utilizing the information to (a) control an image writing device such as a modulatable multi-color scanning beam to write the image information onto a photo-responsive, self-developing positive print, and (b) to write the information onto another information-receiving stripe on the newly produced print. In addition, the information read from the encoded stripe can also be used to display the visual image on a cathode ray tube or similar display device and/or transmitted by telecommunication techniques to a remote location.

A principal objective of the present invention is, therefore, the provision of a combined visual image and information bearing medium by which machine encodable information corresponding to the visual image is stored on a machine readable storage means to provide a photorecord that can be used to reproduce itself or for display purposes. Other objects and the further scope of applicability of the present invention will become apparent from the detailed description to follow, taken in conjunction with the accompanying drawings, in which like parts are designated by like reference characters.

DETAILED DESCRIPTION OF THE PREFERRED EMBODIMENTS

Figure 1:
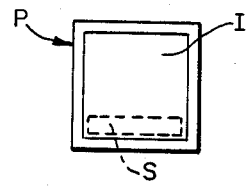
FIG. 1 is an illustration of an image bearing photorecord with an information bearing storage medium affixed thereto.

In accordance with one aspect of the present invention, a combined visual image and information bearing medium is provided which carries both a visual image and visually indiscernible machine readable information that can be used to reproduce the image. An exemplary visual image and information bearing medium in accordance with the present invention, termed a photorecord, is shown in FIG. 1 and is generally designated by the reference character P. The photorecord P takes the form of an image bearing photoprint having an image area I and a machine encodable and readable information bearing area or stripe S. The information bearing stripe S may be defined by a segment of magnetic tape that is affixed to the image bearing medium either on the same side as the image I or on the opposite side, as shown in FIG. 1. If desired, the magnetic stripe S may be formed integrally with the image bearing medium.

Figure 2:
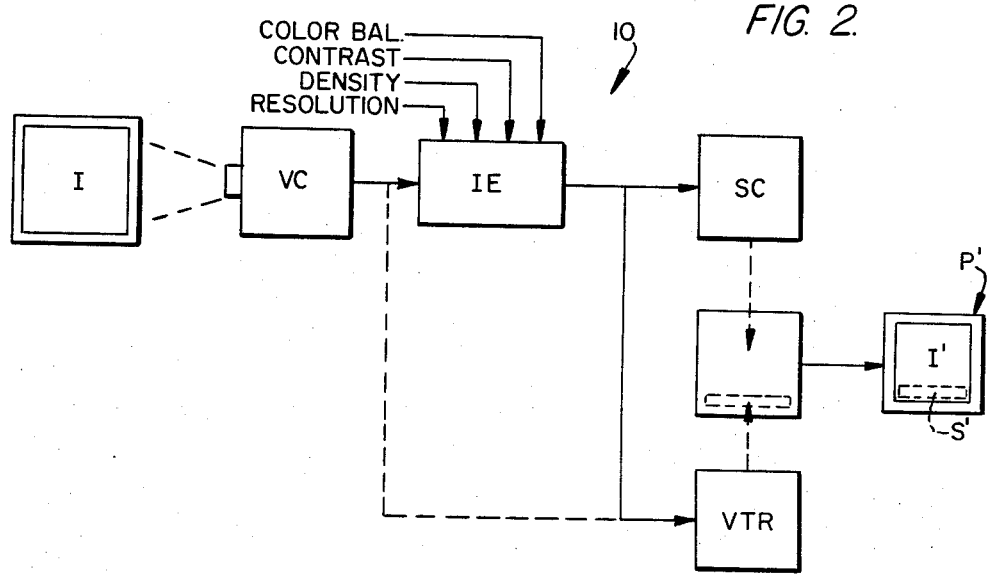
FIG. 2 is a schematic block diagram of an image converting system for converting an image to machine readable information and using that information to produce the photorecord of FIG. 1.

A system for producing an original photorecord P of the type shown in FIG. 1 is illustrated in schematic form in FIG. 2 and is designated therein generally by the reference character 10. The system 10 includes a video camera VC which provides a video signal output to an image enhancer IE which may be controlled to modify the video signal, for example, by varying the color balance, contrast ratio, density, resolution, etc., to enhance the visual image. The output of the image enhancer, which is an electrical signal representing the enhanced image, is presented to both an image scanner SC and a video tape recorder VTR as shown by the solid line signal paths in FIG. 2. The image scanner SC is controlled by the output of the image enhancer IE to expose a photosensitive area of an unexposed photorecord. The image scanner SC may take the form of a modulatable three-color writing beam that is scanned across the photosensitive area with its beam intensities controlled to effect the desired exposure of the photosensitive material. The signal output of the image enhancer IE is also converted by the video tape recorder VTR into a machine readable code in accordance with one of several known formats, for example the VHS or Beta format or other suitable formats, and then recorded onto the magnetic stripe. The exposed photorecord is then processed to develop the visible image and produce the resulting photorecord P'. As indicated by the dotted line signal path between the video camera VC and the video tape recorder VTR, the signal output of the video camera, if desired, may be recorded onto the magnetic stripe without enhancement.

Figure 3:
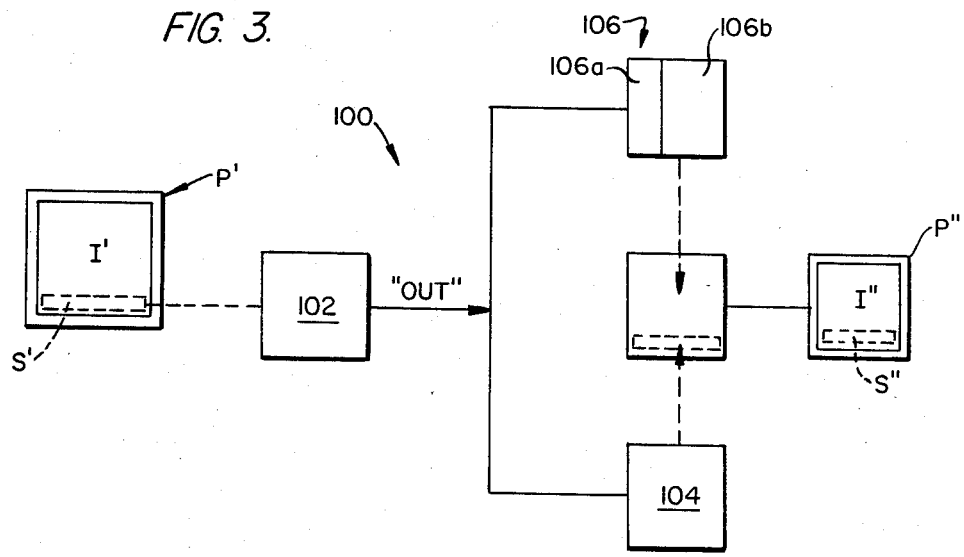
FIG. 3 is a schematic block diagram of a system by which the photorecord produced in accordance with FIG. 2 may be reproduced.
Figure 5:
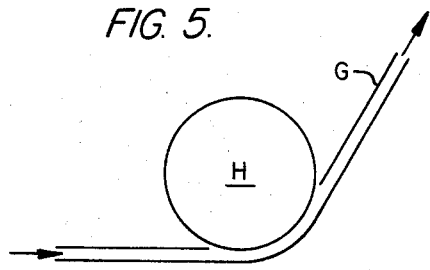
FIG. 5 is an illustration of a magnetic tape read head and associated guideways for transporting the photorecord of FIG. 1 past the read head.

The photorecord P' produced in accordance with the apparatus of FIG. 1 can be used to reproduce itself utilizing the reproduction system 100 of FIG. 3. The reproduction system 100 includes a reader 102 that accepts the photorecord P' produced as described above in accordance with FIG. 1 and reads the information bearing magnetic stripe S' to provide an output signal 'out'. The reader 102 can be a conventional video tape recorder modified to accept the photorecord P' as shown in FIG. 5. As shown therein, the reader 102 can include a head H and an associated guideway G. The photorecord P' can enter the guideway G and be transported in the direction of the arrows to a peripheral portion of the head H while the head scans or reads the information on the magnetic stripe S'. The diameter of the head H is selected to minimize bending of the photorecord P'.

A portion of the video output signal 'out' from the reader 102 is presented to a video tape recorder 104 or like device which reconverts the video signal from the reader 102 to an encoded information format and writes the encoded signal to a magnetic stripe S" on a new photorecord P".

In addition, the video signal 'out' is provided to an image producing device 106, which includes a data conditioning section 106a and a scanning section 106b. The data conditioning section 106a conditions or transforms the signal from the reader 102 so that it is in a form usable by the scanning section 106b. The image producing device 106 may take the form of a modulatable three-color writing beam that is scanned across the blank photosensitive material, for example, a self-developing print. After exposure of the photosensitive area, the exposed photorecord is processed to provide the final reproduced photorecord P". The resulting photorecord P" can then be used to reproduce itself in the manner described above.

As can be appreciated by those skilled in the art, the exact sequence described above to reproduce a photorecord P can be varied. For example, a blank photorecord can be prepared by affixing a blank magnetic stripe to an unexposed self-developing print. The self-developing print can then be exposed and processed with the encoded information written to the magnetic stripe before or after image processing is completed.

Figure 4:
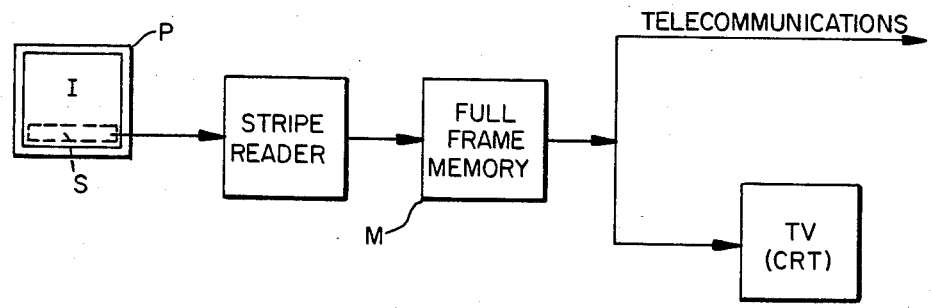
FIG. 4 is a schematic block diagram of a system by which the machine encoded information on a photorecord may be utilized for display on a cathode ray tube type display or transmitted for remote display.

The completed photorecord P can be used for display and telecommunication as shown in FIG. 4. The magnetic stripe is read by a stripe reader and provided to a full-frame buffer memory M. The output of the memory M is provided to a conventional television (CRT) or similar display or if desired, utilized for telecommunications purposes. As can be appreciated by those skilled in the art, the information read from the stripe S may be subjected to data conditioning or transformation to place it into a form compatible with the particular display device, such as the CRT shown in FIG. 4.

Figure 6:
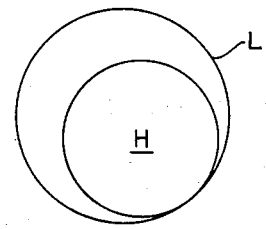
FIG. 6 is a schematic view of a single frame buffer memory suitable for containing the machine encodable visible image related information.

The full-frame buffer memory M may be a conventional solid-state memory utilized to store information sufficient to reconstruct one full video frame or may take the form of a continuous loop memory as shown in FIG. 6. In the continuous loop memory, a magnetic head H initially writes the video information to a continuous loop of magnetic tape L, the path length of which is approximately equal to the full-frame length, and thereafter reads the encoded loop as the tape and head move relative to one another. The output of the full-frame memory M is provided to a television receiver TV to permit continuous display of the visual image. In addition, the output of the memory can be transmitted by telecommunication techniques to a remote location for remote display or reproduction.

Figure 7:
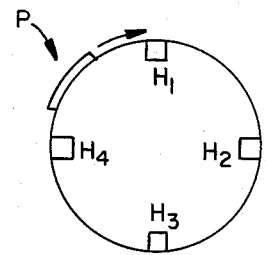
FIG. 7 is a schematic view of a multi-head photorecord reader for reading the machine encodable information from the photorecord.

As an alternative to the full-frame memory M of FIG. 6, a continuous reader arrangement may be utilized as shown in FIG. 7 by which the photorecord P is transported about a closed circuit past read heads $H_1 \ldots _4$ that sequentially read the magnetic stripe S and provide the signal to the TV and/or the telecommunications path.

While the present invention has been disclosed in the context of a photorecord, it is also suitable for use, for example, for identification badges or cards by which the photograph of the cardholder and related information is displayed in visual form on the card and in addition, recorded on the associated magnetic stripe in machine readable form. Thus, a comparison can be made, using a suitable reader 102 and CRT display, between the visual image information present on the identification card and that recorded on the magnetic stripe. As can be appreciated, tampering or forgery of such cards would be extremely difficult.

The disclosed embodiment has been described as using a magnetic recording stripe and associated machinery by which the visual image is converted to machine readable information recorded onto the magnetic stripe. As can be appreciated by those skilled in the art, other information recording schemes may be utilized to effect information recording. For example, the visible image can be converted into an optical code which can be written to a photosensitive portion of the resulting photorecord or to photoresponsive plastics using laser encoding and the like. In addition, the invention has been described herein in the context of forming the visual image using photoresponsive systems. As can be appreciated by those skilled in the image making art, other imaging systems can be used for forming the visible imaging including the control of a mechanical printer, a laser image forming device and the like. The data obtained from the information bearing record, of course, would have to be conditioned to be compatible with the particular image forming device utilized. In addition, it will be appreciated that the information bearing record could be made by scanning an existing print or transparency and that the record made in this manner could thereafter be affixed to the previously scanned print or transparency in order to enable duplicates to be made directly therefrom without further scanning.

Thus, it will be appreciated that as a result of the present invention, a highly effective combined visual image and information bearing medium is provided and related reproduction method and apparatus by which the principal objective, among others, is completely fulfilled. It will be equally apparent and is contemplated that modifications and/or changes may be made to the illustrated embodiments without departure from the invention. Accordingly, it is expressed and intended that the foregoing description and accompanying drawings are illustrative of preferred embodiments only, not limiting, and that the true spirit and scope of the present invention will be determined by reference to appended claims.

What is claimed is:

1. A method of reproducing an original article having a visible image thereon as well as visually indiscernible machine readable information for reproducing the image, said method comprising the steps of:
    reading the machine readable information of the original article and converting said information into corresponding electrical signals;
    providing an information bearing medium having means for receiving and storing an electrical signal as visually indescernible machine readable information and means for receiving and supporting a visible image;
    storing said electrical signals on said means for receiving and storing as visually indiscernible machine readable information; and
    controlling a means for generating an image with said electrical signals to generate an image on said means for receiving and supporting a visible image.

2. The method claimed in claim 1 wherein said electrical signals are modified electronically prior to said storing and controlling steps, to alter at least one visible characteristic of the subsequently produced visible image.

3. The method claimed in claim 2 wherein said means for receiving and storing said electrical signals effects receiving and storing magnetically.

4. The method claimed in claim 1 wherein said means for generating an image comprises means for generating an image optically and said means for receiving and supporting a visible image comprises optically responsive photochemical imaging means.

5. The method claimed in claim 4 wherein said controlling step further comprises:
    controlling an optical exposing means for exposing said optically responsive photochemical imaging means and processing said photochemical imaging means to produce the visible image.

6. The method claimed in claim 5 wherein said optically responsive photochemical imaging means of said information bearing media is of the self-developing print type.

7. A system for producing a copy of an original article having a visible image thereon as well as visually indiscernible machine readable information for reproducing the image, comprising:
    means for reading the machine readable information of the original article and converting said information into corresponding electrical signals;
    means for storing said electrical signals on a means of said copy for receiving and storing an electrical signal as visually indiscernible machine readable information; and
    means for generating an image using said electrical signals on a means of said copy for receiving and supporting a visible image.

8. The system of claim 7 further comprising:
    means for modifying the electrical signals to alter at least one visible characteristic of said visible image.

9. The system of claim 7 wherein said means for storing said electrical signals effects storage magnetically.

10. The system of claim 7 wherein said means for generating an image further comprises means for optically exposing a photosensitive means of said article.

* * * * *